United States Patent
Greene et al.

(10) Patent No.: US 9,725,661 B2
(45) Date of Patent: Aug. 8, 2017

(54) UPGRADING RAW SHALE-DERIVED CRUDE OILS TO HYDROCARBON DISTILLATE FUELS

(71) Applicant: Lummus Technology Inc., Bloomfield, NJ (US)

(72) Inventors: Marvin I. Greene, Clifton, NJ (US); Ujjal K. Mukherjee, Montclair, NJ (US); Arun Arora, Bloomfield, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 225 days.

(21) Appl. No.: 14/793,045

(22) Filed: Jul. 7, 2015

(65) Prior Publication Data

US 2015/0307790 A1 Oct. 29, 2015

Related U.S. Application Data

(63) Continuation of application No. 13/757,203, filed on Feb. 1, 2013, now Pat. No. 9,080,113.

(51) Int. Cl.
*C10G 65/12* (2006.01)
*C10G 63/02* (2006.01)
(Continued)

(52) U.S. Cl.
CPC ............ *C10G 63/02* (2013.01); *B01J 19/245* (2013.01); *C10G 1/002* (2013.01); *C10G 45/00* (2013.01);
(Continued)

(58) Field of Classification Search
CPC ........ C10G 65/12; C10G 45/54; C10G 45/00; C10G 1/002; C10G 45/38; C10G 45/32;
(Continued)

(56) References Cited

U.S. PATENT DOCUMENTS

| 344,840 A | 7/1886 | Lester, Jr. |
| 3,669,873 A | 6/1972 | Jaffe et al. |

(Continued)

FOREIGN PATENT DOCUMENTS

| EP | 1600491 A1 | 11/2005 |
| FR | 2969648 A1 | 6/2012 |

OTHER PUBLICATIONS

Patent Examination Report No. 1 issued Feb. 13, 2016 in corresponding Australian application No. 2014212784 (3 pages).

(Continued)

*Primary Examiner* — Randy Boyer
*Assistant Examiner* — Juan Valencia
(74) *Attorney, Agent, or Firm* — Osha Liang LLP

(57) ABSTRACT

Integrated processes for upgrading crude shale-derived oils, such as those produced by oil shale retorting or by in situ extraction or combinations thereof. Processes disclosed provide for a split-flow processing scheme to upgrade whole shale oil. The split flow concepts described herein, i.e., naphtha and kerosene hydrotreating in one or more stages and gas oil hydrotreating in one or more stages, requires additional equipment as compared to the alternative approach of whole oil hydrotreating. While contrary to conventional wisdom as requiring more capital equipment to achieve the same final product specifications, the operating efficiency vis a vis on-stream time efficiency and product quality resulting from the split flow concept far exceed in value the somewhat incrementally higher capital expenditure costs.

25 Claims, 5 Drawing Sheets

(51) Int. Cl.
| | |
|---|---|
| *C10G 45/00* | (2006.01) |
| *C10G 45/02* | (2006.01) |
| *C10G 45/32* | (2006.01) |
| *C10G 45/38* | (2006.01) |
| *C10G 45/44* | (2006.01) |
| *C10G 45/50* | (2006.01) |
| *C10G 45/54* | (2006.01) |
| *C10G 65/00* | (2006.01) |
| *C10G 65/08* | (2006.01) |
| *C10G 1/00* | (2006.01) |
| *B01J 19/24* | (2006.01) |

(52) U.S. Cl.
CPC ............. *C10G 45/02* (2013.01); *C10G 45/32* (2013.01); *C10G 45/38* (2013.01); *C10G 45/44* (2013.01); *C10G 45/50* (2013.01); *C10G 45/54* (2013.01); *C10G 65/00* (2013.01); *C10G 65/08* (2013.01); *C10G 65/12* (2013.01); *B01J 2219/24* (2013.01); *C10G 2400/02* (2013.01); *C10G 2400/04* (2013.01); *C10G 2400/08* (2013.01)

(58) Field of Classification Search
CPC ........ C10G 45/02; C10G 45/50; C10G 45/44; C10G 65/00; C10G 65/08; C10G 2400/08; C10G 2400/04; C10G 2400/02
See application file for complete search history.

(56) References Cited

U.S. PATENT DOCUMENTS

| | | | |
|---|---|---|---|
| 3,902,991 A | 9/1975 | Christensen et al. | |
| 4,133,745 A | 1/1979 | Wunderlich | |
| 4,141,820 A | 2/1979 | Sullivan | |
| 4,153,540 A | 5/1979 | Gorring et al. | |
| 4,188,280 A | 2/1980 | Jensen | |
| 4,238,320 A | 12/1980 | Cronauer et al. | |
| 4,257,872 A | 3/1981 | La Pierre et al. | |
| 4,342,641 A | 8/1982 | Reif et al. | |
| 4,356,079 A | 10/1982 | Desaau | |
| 4,409,092 A | 10/1983 | Johnson et al. | |
| 4,419,218 A | 12/1983 | Angevine et al. | |
| 4,424,118 A | 1/1984 | Rankel | |
| 4,462,897 A | 7/1984 | Miller | |
| 4,483,763 A | 11/1984 | Kuk et al. | |
| 4,510,037 A | 4/1985 | Johanson et al. | |
| 4,518,480 A | 5/1985 | Audeh et al. | |
| 4,519,900 A | 5/1985 | Angevine et al. | |
| 4,539,101 A | 9/1985 | Oleck et al. | |
| 4,548,702 A | 10/1985 | York et al. | |
| 4,601,998 A | 7/1986 | Oleck et al. | |
| 4,605,489 A | 8/1986 | Madgavkar | |
| 4,620,922 A | 11/1986 | Tait et al. | |
| 4,771,027 A | 9/1988 | Tait et al. | |
| 4,875,992 A | 10/1989 | Hamner | |
| 4,885,080 A * | 12/1989 | Brown ................... | C10G 65/16 208/211 |
| 4,950,383 A | 8/1990 | Tait et al. | |
| 4,976,848 A | 12/1990 | Johnson | |
| 4,990,243 A | 2/1991 | Winslow et al. | |
| 5,009,770 A | 4/1991 | Miller et al. | |
| 5,177,047 A | 1/1993 | Threlkel | |
| 5,183,561 A | 2/1993 | Kresge et al. | |
| 5,215,955 A | 6/1993 | Threlkel | |
| 5,376,258 A | 12/1994 | Sakoda | |
| 5,389,241 A | 2/1995 | Sudhakar et al. | |
| 5,500,401 A | 3/1996 | Sudhakar et al. | |
| 5,914,027 A | 6/1999 | Ellingsen | |
| 6,139,722 A | 10/2000 | Kirkbride et al. | |
| 7,513,988 B2 | 4/2009 | Oballa et al. | |
| 2009/0000985 A1 | 1/2009 | Van Wees et al. | |
| 2009/0137854 A1 | 5/2009 | O'Rear | |
| 2010/0206770 A1 | 8/2010 | Matsui et al. | |
| 2011/0005976 A1 | 1/2011 | Rispoli et al. | |
| 2013/0319908 A1 | 12/2013 | Halais et al. | |

OTHER PUBLICATIONS

Search Report issued in Estonian Application No. P201500027; Dated Mar. 11, 2016 (1 page).
International Search Report and Written Opinion issued May 13, 2014 in corresponding International Application No. PCT/US2014/012161 (17 pages).
International Preliminary Report on Patentability issued Aug. 13, 2015 in corresponding International application No. PCT/US2014/012161 (14 pages).

* cited by examiner

UPGRADING RAW SHALE-DERIVED CRUDE OILS TO HYDROCARBON DISTILLATE FUELS

CROSS-REFERENCE TO RELATED APPLICATION

This application, pursuant to 35 U.S.C. §120, claims benefit to U.S. patent application Ser. No. 13/757,203 filed Feb. 1, 2013, now U.S. Pat. No. 9,080,113, which is incorporated herein by reference in its entirety.

FIELD OF THE DISCLOSURE

Embodiments disclosed herein relate generally to upgrading of whole shale oils, such as crude oil shale-derived oils produced by oil shale retorting or in situ extraction.

BACKGROUND

Whole shale oil contains distillate and residuum fractions with widely different compositions beginning with light hydrocarbons typically boiling in the C4 range and extending to a wide range of higher distillate boiling hydrocarbons and heteroatomic compounds up to and including compounds boiling in the 975° F.+ vacuum residuum range. These wide boiling ranges of hydrocarbons and heteroatomic compounds can have widely varying reactivities in downstream catalytic or thermal upgrading processes. Raw shale oil may contain nitrogen containing compounds, metals such as arsenic and/or selenium and compounds of arsenic and/or selenium and other impurities such as sulfur containing compounds. Additionally, raw shale oil may also contain particulate matter comprised of fine oil shale particles that are entrained or trapped in the recovered whole shale oil products from the upstream retorting or in situ extraction processes. The hydrocarbons in whole shale oil may include various paraffins, olefins, diolefins, and aromatics, including heavy oil, gas oil, and asphaltenes containing multiple fused aromatic ring compounds.

Whole shale oils are conventionally processed in a single hydrotreating reactor. The reactor is operated at a single hydroprocessing severity, which, however, cannot effectively perform the required hydroprocessing reactions to upgrade the whole shale oil without encountering the processing penalties of severe fouling/plugging and poor selectivity, e.g., gas formation. This is a result of the different compositions and reactivities of the various fractions in the whole shale oil.

Other processes disclose use of multiple reactors to upgrade the whole shale oil. For example, U.S. Pat. No. 4,133,745 discloses a process for processing shale oil in which the shale oil is fractionated into a naphtha cut, boiling below 350° F., and a gas oil cut, boiling above 350° F. The naphtha cut is then hydrotreated to remove nitrogen and the gas oil cut is treated to remove impurities, such as by caustic treating. The gas oil cut is then hydrotreated to remove nitrogen compounds and fractionated to produce a second naphtha cut boiling below 450° F. While this approach manages to hydroprocess all but a minor portion of the light naphtha portion, it suffers from the attendant deficiencies of fouling, plugging, and selectivity issues.

SUMMARY OF THE CLAIMED EMBODIMENTS

In contrast to prior processes, embodiments disclosed herein advantageously separate whole shale oil or partially hydrotreated whole shale oil so as to effectively perform the required hydroprocessing reactions, namely, diolefins saturation; hydrodemetallization (HDM); monoolefins saturation; hydrodenitrogenation (HDN); hydrodesulfurization (HDS); hydrodeoxygenation (HDO), without the penalties of severe fouling/plugging and poor selectivity, e.g., gas formation, to produce higher-valued hydrocarbon products.

Contrary to conventional thought in the industry, flow schemes disclosed herein, having a split flow concept for hydroprocessing of different shale oil fractions in separate hydroprocessing reactors, may be economically viable, even though they may require additional reactors and associated processing equipment. However, the ability to optimize hydroprocessing conditions in each of the separate hydroprocessing reactors will allow significant improvements such as for example minimization of catalyst fouling rates; higher on-stream time efficiencies; and significant improvements in hydroprocessed product qualities with the latter affording higher product revenues, thus lowering the net operating costs and mitigating the incrementally higher capital investment costs.

In one aspect, embodiments disclosed herein relate to an integrated process for upgrading crude shale-derived oils produced by oil shale retorting or by in situ extraction or by mixtures thereof. The process may include the following steps: (a) fractionating the whole shale oil into a first fraction comprising naphtha, kerosene and diesel and an atmospheric bottoms fraction comprising gas oil and residuum; (b) contacting the first fraction and hydrogen in a first-stage hydroprocessing reactor containing a hydrogenation catalyst to saturate diolefins contained in the first fraction and recovering an effluent from the first-stage hydroprocessing reactor; (c) feeding the effluent from the first-stage hydroprocessing reactor of step (b) without phase separation to a second-stage hydroprocessing reactor operated in an upflow mode and containing catalysts to perform hydrodemetallization and saturation of mono-olefins in the effluent from the first-stage hydroprocessing reactor and recovering an effluent from the second-stage hydroprocessing reactor; (d) feeding the effluent from the second-stage hydroprocessing reactor of step (c) without phase separation to a third-stage hydroprocessing reactor having one or more beds of catalyst to perform hydrodenitrogenation, hydrodesulfurization, hydrodeoxygenation, and aromatics saturation of the effluent from the second-stage hydroprocessing reactor and recovering an effluent from the third-stage hydroprocessing reactor; (e) feeding the atmospheric bottoms fraction and hydrogen to a fourth-stage hydroprocessing reactor operated in an upflow mode and containing catalysts to perform hydrodemetallization of the atmospheric bottoms fraction and recovering an effluent from the fourth-stage reactor; (f) feeding the effluent from the fourth-stage hydroprocessing reactor of step (e) without phase separation to a fifth-stage hydroprocessing reactor having one or more beds of catalyst each containing a catalyst to perform one or more of hydrotreating and hydrocracking of the effluent from the fourth-stage hydroprocessing reactor and recovering an effluent from the fifth-stage hydroprocessing reactor; and (g) processing the effluents from the fifth-stage hydroprocessing reactor of step (f) and the third-stage hydroprocessing reactor of step (d) in a separation train to recover two or more hydrocarbon fractions.

In another aspect, embodiments disclosed herein relate to an integrated process for upgrading crude shale-derived oils produced by oil shale retorting or by in situ extraction or combinations thereof. The process may include the following steps: (a) fractionating the whole shale oil into a first fraction comprising naphtha, kerosene and diesel and an atmospheric bottoms fraction comprising gas oil and residuum; (b) feeding the first fraction and hydrogen to a first-stage hydroprocessing reactor containing a hydrogenation catalyst to saturate diolefins contained in the first fraction and recovering an effluent from the first-stage hydroprocessing reactor; (c) feeding the effluent from the first-stage hydroprocessing reactor of step (b) without phase separation to a second-stage hydroprocessing reactor operated in an upflow mode and containing catalysts to perform hydrodemetallization and saturation of mono-olefins in the effluent from the first-stage hydroprocessing reactor and recovering an effluent from the second-stage hydroprocessing reactor; (d) feeding the atmospheric bottoms fraction and hydrogen to a third-stage hydroprocessing reactor operated in an upflow mode and containing catalysts to perform hydrodemetallization and recovering an effluent from the third-stage hydroprocessing reactor; (e) feeding the effluent from the third-stage hydroprocessing reactor of step (d) without phase separation to a fourth-stage hydroprocessing reactor having one or more beds of catalyst each containing a catalyst to perform one or more of hydrotreating and hydrocracking of the effluent from the third-stage hydroprocessing reactor and recovering an effluent from the fourth-stage hydroprocessing reactor; (f) feeding the effluent from the second-stage hydroprocessing reactor of step (c) and the effluent from the fourth-stage hydroprocessing reactor of step (e), without phase separation, to a fifth-stage hydroprocessing reactor having one or more beds of catalyst to perform hydrodenitrogenation, hydrodesulfurization, hydrodeoxygenation, and aromatics saturation of the effluents from the second- and fourth-stage hydroprocessing reactors and recovering an effluent from the fifth-stage hydroprocessing reactor; and (g) processing the effluents from the fifth-stage hydroprocessing reactor of step f) in a separation train to recover two or more hydrocarbon fractions.

In another aspect, embodiments disclosed herein relate to an integrated process for upgrading crude shale-derived oils produced by oil shale retorting or by in situ extraction or combinations thereof. The process may include the following steps: (a) contacting the whole shale oil and hydrogen in a first-stage hydroprocessing reactor containing hydrogenation catalysts to saturate diolefins contained in the whole shale oil and recovering an effluent from the first-stage hydroprocessing reactor; (b) feeding the effluent from the first-stage hydroprocessing reactor of step (a) without phase separation to a second-stage hydroprocessing reactor operated in an upflow mode and containing catalysts to perform hydrodemetallization and saturation of mono-olefins in the effluent from the first-stage hydroprocessing reactor and recovering an effluent from the second-stage hydroprocessing reactor; (c) fractionating the effluent from the second-stage hydroprocessing reactor of step (b) into a partially hydrotreated fraction comprising naphtha, kerosene and diesel and a partially hydrotreated bottoms fraction comprising gas oil and residuum; (d) feeding the partially hydrotreated fraction to a third-stage hydroprocessing reactor having one or more beds of catalyst to perform hydrodenitrogenation, hydrodesulfurization, hydrodeoxygenation, and hydrodearomatization of the partially hydrotreated fraction and recovering an effluent from the third-stage hydroprocessing reactor; (e) feeding the partially hydrotreated bottoms fraction to a fourth-stage hydroprocessing reactor having one or more beds of catalyst to perform hydrodenitrogenation, hydrodesulfurization, hydrodeoxygenation, and aromatics saturation of the partially hydrotreated bottoms fraction and recovering an effluent from the fourth-stage hydroprocessing reactor; and (f) processing the effluents from the third-stage hydroprocessing reactor of step (d) and the fourth-stage hydroprocessing reactor of step (e) in a separation train to recover two or more hydrocarbon fractions.

In another aspect, embodiments disclosed herein relate to an integrated process for upgrading crude shale-derived oils produced by oil shale retorting or by in situ extraction or combinations thereof. The process may include the following steps: (a) contacting the whole shale oil and hydrogen in a first-stage hydroprocessing reactor containing catalysts to saturate diolefins contained in the whole shale oil and recovering an effluent from the first-stage hydroprocessing reactor; (b) feeding the effluent from the first-stage hydroprocessing reactor of step (a) without phase separation to a second-stage hydroprocessing reactor operated in an upflow mode and containing catalysts to perform hydrodemetallization and saturation of mono-olefins in the effluent from the first-stage hydroprocessing reactor and recovering an effluent from the second-stage hydroprocessing reactor; (c) fractionating the effluent from the second-stage hydroprocessing reactor of step (b) into a partially hydrotreated fraction comprising naphtha, kerosene and diesel and a partially hydrotreated bottoms fraction comprising gas oil and residuum; (d) feeding the partially hydrotreated bottoms fraction to a third-stage hydroprocessing reactor having one or more beds of catalyst to perform hydrodenitrogenation, hydrodesulfurization, hydrodeoxygenation, and aromatics saturation of the partially hydrotreated bottoms fraction and recovering an effluent from the third-stage hydroprocessing reactor; (e) mixing the partially hydrotreated fraction and the effluent from the third-stage hydroprocessing reactor to form a mixture; (f) feeding the mixture to a fourth-stage hydroprocessing reactor having one or more beds of catalyst to perform hydrodenitrogenation, hydrodesulfurization, hydrodeoxygenation, and aromatics saturation of the mixture and recovering an effluent from the fourth-stage hydroprocessing reactor; and (g) processing the effluent from the fourth-stage hydroprocessing reactor in a separation train to recover two or more hydrocarbon fractions.

In another aspect, embodiments disclosed herein relate to an integrated process for upgrading crude shale-derived oils produced by oil shale retorting or by in situ extraction or combinations thereof. The process may include the following steps: (a) contacting the whole shale oil and hydrogen in a first-stage hydroprocessing reactor containing catalysts to saturate diolefins contained in the whole shale oil and recovering an effluent from the first-stage hydroprocessing reactor; (b) feeding the effluent from the first-stage hydroprocessing reactor of step (a) without phase separation to a second-stage hydroprocessing reactor operated in an upflow mode and containing catalysts to perform hydrodemetallization and saturation of mono-olefins in the effluent from the first-stage hydroprocessing reactor and recovering an effluent from the second-stage hydroprocessing reactor; (c) feeding the effluent from the second-stage hydroprocessing reactor of step (b) without phase separation to a third-stage hydroprocessing reactor having one or more beds of catalyst to perform hydrodenitrogenation, hydrodesulfurization, hydrodeoxygenation, and aromatics saturation of the effluent from the second-stage hydroprocessing reactor and recovering an effluent from the third-stage hydroprocessing reactor; (d) fractionating the effluent from the third-stage hydroprocessing reactor of step (c) into a partially hydrotreated fraction, comprising naphtha, kerosene and diesel, and a partially hydrotreated vacuum gas oil fraction; (e) feeding the partially hydrotreated vacuum gas oil fraction to a fourth-stage hydroprocessing reactor having one or more beds of catalyst to perform hydrocracking of the partially hydrotreated vacuum gas oil fraction and recovering an effluent from the fourth-stage hydroprocessing reactor; (f) feeding the effluent from the fourth-stage hydroprocessing reactor to the fractionation step (d).

Other aspects and advantages will be apparent from the following description and the appended claims.

DETAILED DESCRIPTION

In one aspect, embodiments herein relate to hydrotreating whole shale oil such as crude oil shale-derived oils produced by either oil shale retorting or in situ extraction or mixtures thereof. Whole shale oil, as noted above, contains distillate fractions with widely different compositions and reactivities. Embodiments disclosed herein advantageously separate the whole shale oil or partially hydrotreated whole shale oil so as to effectively perform the required hydroprocessing reactions, namely, diolefins saturation (DOS); hydrodemetallization (HDM); monoolefins saturation (MOS); hydrodenitrogenation (HDN); hydrodesulfurization (HDS); hydrodeoxygenation (HDO); hydrodearomatization (HDA) and gas oil hydrocracking (HYC), without the penalties of severe fouling/plugging and poor selectivity, i.e., high gas formation, to produce higher-valued hydrocarbon products.

Figure 1:
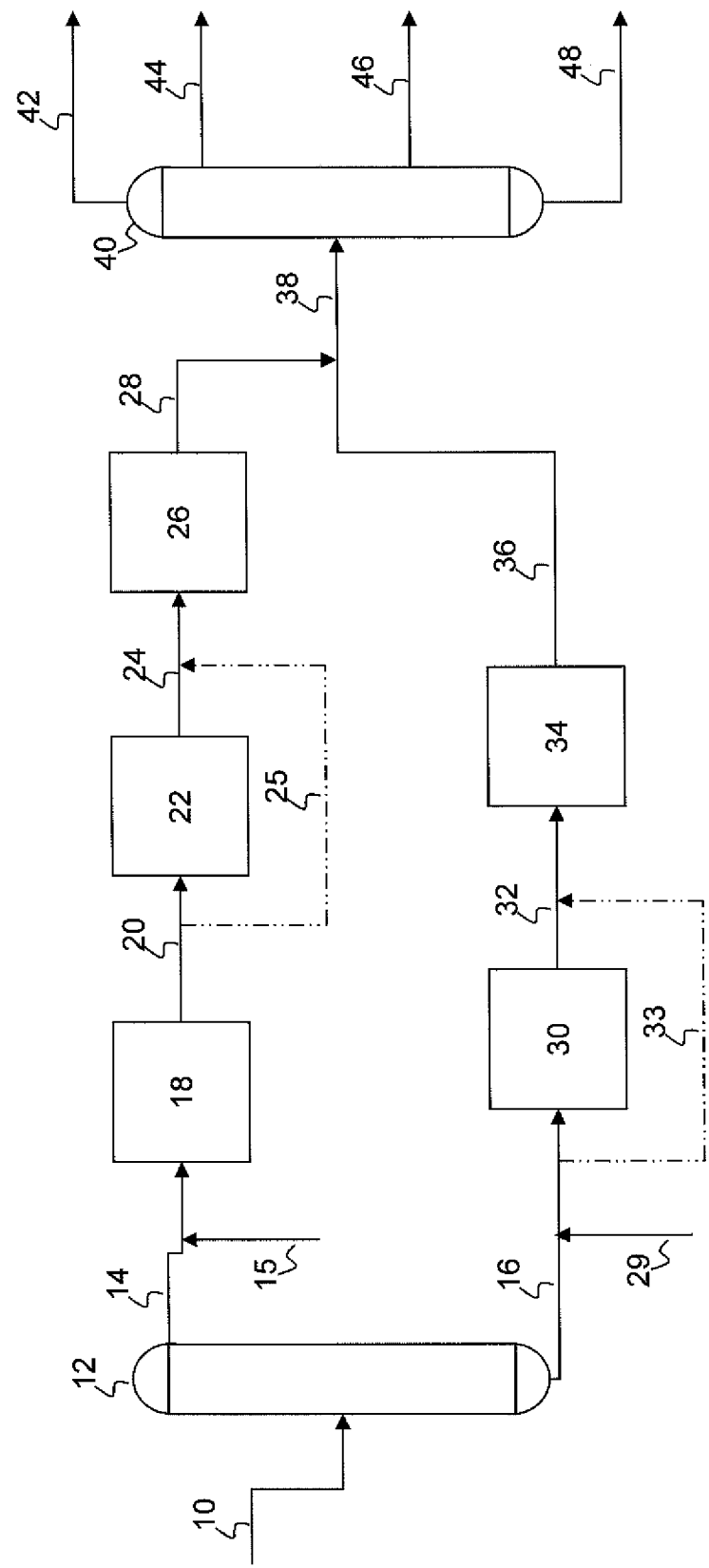
FIGS. 1-5 illustrate simplified process flow diagrams of processes for upgrading whole shale oil according to embodiments disclosed herein.

Referring now to FIG. 1, a simplified flow diagram of an integrated process for upgrading crude shale-derived oils, such as those produced by oil shale retorting or in situ extraction or mixtures thereof, according to embodiments herein is illustrated. A whole shale oil 10 may be fed to a fractionator 12 to fractionate the whole shale oil into a first fraction 14, including naphtha, kerosene and diesel (NKD), and a second fraction 16, including gas oil and residuum (AGO).

The first fraction 14 and hydrogen 15 may be fed to a first-stage NKD hydroprocessing reactor 18 containing a hydrogenation catalyst to saturate diolefins contained in the first fraction. Following hydrogenation, an effluent 20 may be recovered from the first-stage NKD hydroprocessing reactor 18.

The effluent 20 from the first-stage NKD hydroprocessing reactor 18 may then be fed, without phase separation, to a second-stage NKD hydroprocessing reactor 22. Second-stage NKD hydroprocessing reactor 22 may be operated in an upflow mode and may contain catalysts to perform hydrodemetallization and saturation of mono-olefins in the effluent 20 recovered from the first-stage NKD hydroprocessing reactor 18. Following reaction in second-stage NKD hydroprocessing reactor 22, an effluent 24 may be recovered from the second-stage NKD hydroprocessing reactor.

The effluent 24 from the second-stage NKD hydroprocessing reactor 22 may then be fed, without phase separation, to a third-stage NKD hydroprocessing reactor 26. Third-stage NKD hydroprocessing reactor may include one or more beds of catalyst to perform hydrodenitrogenation, hydrodesulfurization, hydrodeoxygenation, and hydrodearomatization of the effluent 24 recovered from the second-stage NKD hydroprocessing reactor 22. Following hydroprocessing, an effluent 28 may be recovered from the third-stage NKD hydroprocessing reactor 26.

The second fraction 16 and hydrogen 29 may be fed to a first-stage AGO hydroprocessing reactor 30. First-stage AGO hydroprocessing reactor 30 may be operated in an upflow mode and may containing catalysts to perform hydrodemetallization of the second fraction 16. Following reaction, an effluent 32 may be recovered from the first-stage AGO hydroprocessing reactor 30.

The effluent 32 from the first-stage AGO hydroprocessing reactor 30 may be fed, without phase separation, to a second-stage AGO hydroprocessing reactor 34. Second-stage AGO hydroprocessing reactor 34 may include one or more beds of catalyst each containing a catalyst to perform one or more of hydrotreating and hydrocracking of the effluent 32 recovered from the first-stage AGO hydroprocessing reactor 30. Following hydrotreating and/or hydrocracking, an effluent 36 may be recovered from the second-stage AGO hydroprocessing reactor 34.

The effluents 28, 36 from the second-stage AGO hydroprocessing reactor 34 and the third-stage NKD hydroprocessing reactor 26 may be combined to form a mixed stream 38 and fed to a separation train 40. Separation train 40 may include one or more distillation and/or extractive distillation columns useful for separating the effluents into two or more hydrocarbon fractions. In some embodiments, such as illustrated in FIG. 1, the two or more fractions may include at least one of light gas byproducts and unreacted hydrogen 42, kerosene 44, diesel 46, and a residuum fraction 48. Other hydrocarbon fractions may also be recovered in various embodiments.

The processing of the first fraction 14 and the second fraction 16 may be performed on a continuous basis. Upflow reactors 22, 30, however, may require more frequent catalyst changes as compared to reactors 18, 26, 34. Bypass lines 25, 33 may be provided for bypassing at least one of the second-stage NKD hydroprocessing reactor 22 and the first-stage AGO hydroprocessing reactor 30 to replace catalyst within the reactors while continuing to operate the remainder of the process, including fractionation in columns 12, 40, and reaction in reactors 18, 26, 34. The ability to bypass reactors 22 and 30 may allow replacement of the catalyst in reactors 22, 30 without shutting down the remainder of the process, increasing unit uptime and continued conversion of whole shale oils to useful hydrocarbons.

Figure 2:
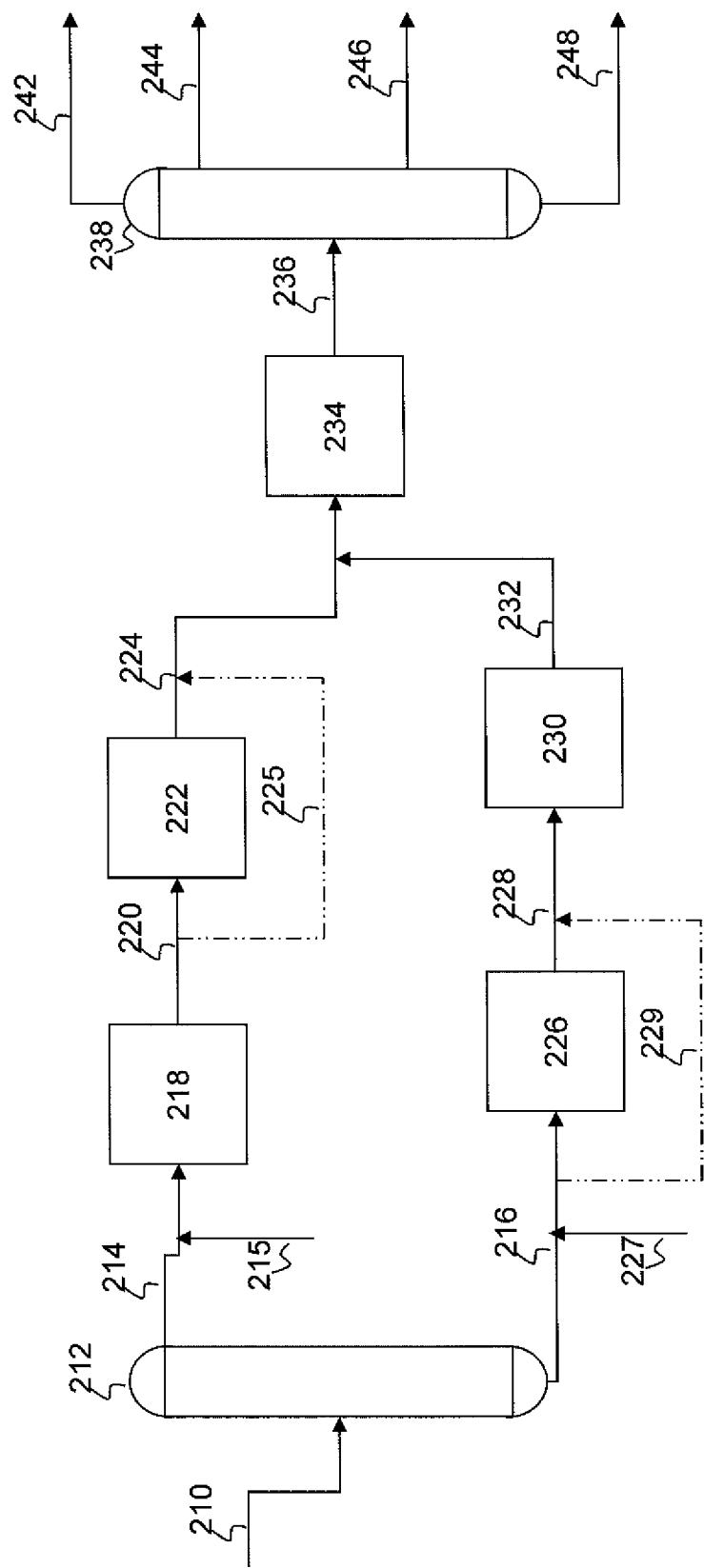

Referring now to FIG. 2, a simplified flow diagram of an integrated process for upgrading crude shale-derived oils produced by oil shale retorting or in situ extraction or mixtures thereof according to embodiments herein is illustrated. A whole shale oil 210 may be fed to a fractionator 212 to fractionate the whole shale oil into a first fraction 214, including naphtha, kerosene and diesel (NKD), and a second fraction 216, including gas oil and residuum (AGO).

The first fraction 214 and hydrogen 215 may be fed to a first-stage NKD hydroprocessing reactor 218 containing a hydrogenation catalyst to saturate diolefins contained in the first fraction. Following hydrogenation, an effluent 220 may be recovered from the first-stage NKD hydroprocessing reactor 218.

The effluent 220 from the first-stage NKD hydroprocessing reactor 218 may then be fed, without phase separation, to a second-stage NKD hydroprocessing reactor 222. Second stage NKD hydroprocessing reactor 222 may be operated in an upflow mode and may contain catalysts to perform hydrodemetallization and saturation of mono-olefins in the effluent 220 recovered from the first-stage NKD hydroprocessing reactor 218. Following reaction in second stage NKD hydroprocessing reactor 222, an effluent 224 may be recovered from the second-stage NKD hydroprocessing reactor.

The second fraction 216 and hydrogen 227 may be fed to a first-stage AGO hydroprocessing reactor operated in an upflow mode and containing catalysts to perform hydrodemetallization. Following reaction, an effluent 228 may be recovered from the first-stage hydroprocessing AGO reactor 226.

The effluent 228 from the first-stage AGO hydroprocessing reactor 226 may be fed, without phase separation, to a second-stage AGO hydroprocessing reactor 230 having one or more beds of catalyst each containing a catalyst to perform one or more of hydrotreating and hydrocracking of the effluent from the first-stage AGO hydroprocessing reactor 226. Following hydrotreating and/or hydrocracking, an effluent 232 may be recovered from the second-stage AGO hydroprocessing reactor 230.

The effluents 224, 232 from the second-stage NKD hydroprocessing reactor 222 and the second-stage AGO hydroprocessing reactor 230, respectively, may then be fed, without phase separation, to a third-stage hydroprocessing reactor 234 having one or more beds of catalyst to perform hydrodenitrogenation, hydrodesulfurization, hydrodeoxygenation, and hydrodearomatization of the combined effluent stream. Following hydroprocessing, an effluent 236 may be recovered from the third-stage hydroprocessing reactor 234.

The effluent 236 from the third-stage hydroprocessing reactor 234 may then be fed to a separation train 238. Separation train 238 may include one or more distillation and/or extractive distillation columns useful for separating the effluents into two or more hydrocarbon fractions. In some embodiments, such as illustrated in FIG. 2, the two or more fractions may include at least one of light gas byproducts and unreacted hydrogen 242, kerosene 244, diesel 246, and a residuum fraction 248. Other hydrocarbon fractions may also be recovered in various embodiments.

The processing of the first fraction 214 and the second fraction 216 may be performed on a continuous basis. Upflow reactors 222, 226, however, may require more frequent catalyst changes as compared to reactors 218, 230, 234. Bypass lines 225, 229 may be provided for bypassing at least one of the second-stage reactor 222 and the first-stage reactor 226 to replace catalyst within the reactors while continuing to operate the remainder of the process, including fractionation in columns 212, 238, and reaction in reactors 218, 230, 234. The ability to bypass reactors 222 and 226 may allow replacement of the catalyst in reactors 222, 226 without shutting down the remainder of the process, increasing unit uptime and continued conversion of whole shale oils to useful hydrocarbons.

As described above with respect to FIGS. 1 and 2, following fractionation of the whole shale oil, the combined light distillates stream (including naphtha, kerosene, and diesel-range material) is first sent through a diolefins saturation ("DOS") reactor that operates at relatively low temperatures. The DOS reactor is followed by an upflow reactor (UFR) that is loaded with different types of hydrodemetallization (HDM) catalysts. Some olefins also get saturated in this reactor. Following the HDM reactor, the light distillates are sent to a primary hydrotreating reactor where hydrodesulfurization (HDS), hydrodenitrogenation (HDN), hydrodeoxygenation (HDO) and some aromatics saturation reactions occur. The primary hydrotreating reactor effluent is sent to a separator where most of the light gases, ammonia, and hydrogen sulfide are stripped out. The combined heavy distillates stream (including gas oil and resid) is first sent through an upflow reactor (UFR) that is loaded with different types of hydrodemetallization (HDM) catalysts. Olefins may also get saturated in this reactor. Following the HDM reactor, the heavy distillates are sent to a hydroprocessing reactor for hydrocracking and hydrotreating of the heavy hydrocarbons.

The hydrotreated heavy and light distillate streams may then be further processed, either together or separately, to recover useful hydrocarbon products. For example, the hydrotreated streams may be let down in pressure for removal of ammonia and hydrogen sulfide. Optionally, the resulting liquid streams may also be fed to an aromatics saturation reactor (not illustrated in FIGS. 1 and 2). The reactor effluents are flashed to recover hydrogen and the liquid hydrocarbon products may be sent to fractionation for product recovery. When it is desired to produce syncrude, only a simple stripper will be required for product recovery. More complex distillation trains may be used to produce hydrocarbon products of discrete boiling ranges.

The reaction section of the processes of FIGS. 1 and 2 thus includes two parallel hydrotreating reactor systems in the same high pressure loop. One reactor system hydrotreats the heavy gasoil feed, while the second reactor system hydrotreats the combined naphtha, kerosene and diesel to remove contaminants. One alternative scheme, as noted above, includes an aromatics saturation reactor to upgrade the hydrotreated whole shale oil to finished products. Without the aromatics saturation reactor, either blending with straight run products to achieve final product specifications or production of whole crude are also available options. The reaction section may also contain equipment for separation of hydrogen-rich gas from the last stage reactor effluents. This gas stream may be compressed and recycled back through the high-pressure reactor loop and combined with make-up hydrogen as necessary.

While described above with respect to the simplified flow diagrams presented for FIGS. 1 and 2, various pieces of equipment may be used to treat the feeds and effluents from each reactor and separation system, including heat exchangers, filters, condensers, reboilers, and other equipment known to those skilled in the art. The following provides a more detailed description of one embodiment of the process. Similar aspects may be extrapolated to other embodiments presented herein, such as the flow schemes of FIGS. 3-5, described below, which provide alternative means for parallel hydrotreating of the heavy gas oil feed and the NKD fraction.

The raw naphtha, kerosene and diesel stream (NKD) may be sent through a feed filter and pumped up to reactor loop pressure by feed pumps. In some embodiments, the feed filter may be an automatic backwash-type filter. For shale oil derived feedstock, a 1 micron sock filter following the automatic backwash filter may also be used. The filtered fresh NKD feed is mixed with preheated hydrogen-rich recycle gas and sent through a naphtha, kerosene and diesel Diolefins Saturation Reactor (NKD DOS). The NKD DOS reactor operates at relatively high liquid hourly space velocity (LHSV) and a relatively low temperature to facilitate diolefins saturation, and thus preventing the formation of catalyst fouling gums through polymerization reactions. The effluent from NKD DOS may be preheated in a feed effluent exchanger and sent through an NKD Upward Flow Guard Reactor (NKD UFR) where metal contaminants are removed. The effluents from the NKD UFR are further heated in a second feed/effluent exchanger and then in the reactor feed furnace. The inlet temperature to the reactor feed furnace may be controlled by adjusting the oil feed bypass around the feed/effluent exchangers to maintain sufficient heat input in the furnace. Maintaining this heat input in the furnace allows stable reactor inlet temperature control and provides operators with the ability to quickly reduce the reactor inlet temperature in an emergency situation.

From the reactor furnace, the stream enters naphtha, kerosene, diesel HDT Reactor (NKD HDT). The NKD HDT Reactor operates at somewhat lower LHSV and higher temperatures for HDS and HDN together with olefins saturation. Here, the oil feed is hydrotreated and partially converted into products. The exothermic HDS, HDN and saturation reactions result in a large heat release that increases the temperature of the reactants. This increased temperature further increases the rate of reaction. In order to control this temperature rise and likewise, the rate of reaction, the catalyst may be separated into multiple beds in the NKD HDT reactor. Cold recycle gas may be introduced between the beds to quench the reacting fluids and thereby control the amount of temperature rise and the rate of reaction.

In a parallel circuit, the raw gasoil stream is sent through a feed filter and a 1 micron sock filter and then pumped up to reactor loop pressure by feed pumps. The filtered fresh oil feed is mixed with preheated hydrogen-rich recycle gas, preheated in a feed/effluent exchanger and sent through Gasoil Upward Flow Guard Reactor (Gasoil UFR) where metal contaminants are removed. The effluent from Gasoil UFR is further preheated in a second feed/effluent exchanger and then in a reactor feed furnace. The inlet temperature to the reactor feed furnace may be controlled by adjusting the oil feed bypass around the feed/effluent exchangers to maintain sufficient heat input in the furnace. Maintaining this heat input in the furnace allows stable reactor inlet temperature control and provides operators with the ability to quickly reduce the reactor inlet temperature in an emergency situation.

From the reactor furnace, the stream enters Gasoil HDT Reactor (Gasoil HDT). Here, the oil feed is hydrotreated and partially converted into products. The exothermic hydrocracking and saturation reactions result in a large heat release that increases the temperature of the reactants. This increased temperature further increases the rate of reaction. In order to control this temperature rise and, likewise, the rate of reaction, the catalyst is separated into multiple beds in the Gasoil HDT reactor. Cold recycle gas may be introduced between the beds to quench the reacting fluids and thereby control the amount of temperature rise and the rate of reaction.

Reactor internals between the catalyst beds may also be designed to ensure thorough mixing of the reactants with quench gas and good distribution of the vapor and liquid flowing down to the next bed. Good distribution of the reactants across the catalyst bed prevents hot spots and maximizes catalyst performance and life. For example, an ISOMIX system, available from Chevron Lummus Global, may be used to provide complete mixing and equilibration of reactants between catalyst beds, correcting any temperature and concentration maldistributions, with low pressure drop while using minimal reactor volume. ISOMIX allows new and retrofitted reactors to successfully employ new high-activity catalysts with very low risk of reactor temperature maldistribution and hot spots often associated with high-activity catalysts.

The Gasoil HDT reactor effluent includes light vaporized hydrocarbons, distillate oils, heavy unconverted oil, and excess hydrogen not consumed in the reaction. The effluent stream is cooled by heat exchange with the oil-gas reactor feed mixture before it is sent through a cascade of separators.

The effluents from both NKD HDT and Gasoil HDT reactors are cooled by exchanging heat against their corresponding feeds and enter separate Hot High Pressure Separators (HIPS) that operate in parallel. The vapor streams from the respective HHPS are combined and cooled by heat exchange with the reactor feed gas and a Cold Low Pressure Separator (CLPS) liquid. At this point, water may be continuously injected into the inlet piping of the HHPS vapor air cooler to prevent the deposition of salts in the air cooler tubes. Without the water injection, ammonia (NH3) and hydrogen sulfide (H2S), which are formed in the reactor by hydrodesulfurization of sulfur species and hydrodenitrogenation of nitrogen species in the feed, can form solid ammonium bisulfide (NH4HS) at cooler temperatures. This solid can deposit on the air cooler tubes, reduce heat transfer, and eventually plug the tubes. Since ammonium bisulfide is soluble in water, the continuous presence of water will dissolve any NH4HS that has formed and thus prevent the deposition of NH4HS solids in the air cooler tubes. Both the water injection piping and the air cooler inlet piping must meet design specifications to ensure uniform distribution of water to the effluent air cooler. This unit is designed to reuse condensate from the fractionator overhead.

The HHPS effluent vapor air cooler cools the effluent for maximum recovery of hydrocarbon liquids from the vapor. The cooled effluent is separated into its hydrogen rich vapor, hydrocarbon liquid, and water phases. The sour water stream containing ammonium bisulfide is sent to sour water stripping. The hydrocarbon liquid is fed to the CLPS.

The hydrogen-rich gas from the CHPS flows into a knockout drum before it enters an H2S absorber. Because of the extremely high H2S concentration, a high-pressure Amine Absorber may be used for maintaining recycle gas quality. For a required hydrogen partial pressure, the high pressure loop operating pressure can be significantly lowered by increasing the recycle gas purity using an amine absorber. Such may also be beneficial for aromatics separation and facilitate use of low reactor temperatures.

The sweetened gas then flows to a knockout drum and then to the recycle gas compressor. The compressor suction line is heat traced to ensure a liquid-free vapor. The recycle compressor delivers the recycle gas to the reactor loop. There is a purge line located upstream of the recycle gas compressor that can be used if necessary to send amine-sweetened recycle gas to the flare. However, no high pressure purge gas rate is required in normal operation. An emergency dump line may be located upstream of the recycle gas compressor to allow quick reduction of pressure in the recycle loop, if necessary, to control reactor temperatures during a loss of the recycle compressor or other upsets.

Part of the recycle compressor discharge gas is routed to the reactors as quench to control the reactor temperature. The remaining recycle gas that is not used as quench is combined with make-up hydrogen to become the reactor feed gas. Reliable, uninterrupted operation of the recycle compressor may facilitate safe operation of the plant. One type of reliable recycle compressor is a centrifugal machine with a steam turbine driver. The reactor feed gas for both stages is heated by exchange with the HHPS vapor before combining with the oil feed streams to each reaction stage.

The process requires a continuous supply of high-pressure make-up hydrogen. In addition to chemical consumption, hydrogen leaves the system as offgas from the cold low pressure separator (CLPS) as dissolved hydrogen in the product distillation feed and may also be lost through system leaks.

In the high-pressure circuit, the liquid stream from the HHPS is reduced in pressure and fed to the Hot Low Pressure Separator (HLPS). The liquid from the Gasoil HLPS is routed directly to the product stripper and the vapor stream is routed to an air cooler and further to the Gasoil Cold Low Pressure Separator (CLPS). In the Gasoil CLPS, the liquid is separated from the vapor and is heated by heat exchange with the Gasoil HHPS vapor before combining with liquid from the NKD HHPS and entering NKD HLPS. The sour gas from the gasoil CLPS and NKD HLPS may be sent for further treatment and hydrogen recovery. The liquid from NKD HLPS is pumped up to the Naphtha/Kerosene/Diesel/Aromatics Saturation (NKD ASAT) reactor loop pressure by the feed pumps. It is preheated in a feed effluent exchanger, mixed with preheated hydrogen rich recycle-gas. The mixture is further preheated against NKD effluent and fed to NKD ASAT reactor.

The preheated stream enters the NKD ASAT reactor. The catalyst in this reactor promotes aromatics saturation and further hydrodesulfurization. Cold recycle gas is introduced between the beds to quench the reacting fluids and thereby control the amount of temperature rise and the rate of reaction.

The effluents from both NKD ASAT reactors is cooled by exchanging heat with NKD ASAT reactor feed, recycle hydrogen rich gas, and NKD product stripper feed, and then sent through an effluent aircooler. At this point, water is continuously injected into the inlet piping of the NKD ASAT reactor effluent air cooler to prevent the deposition of salts in the air cooler tubes.

The NKD ASAT reactor effluent air cooler cools the effluent for maximum recovery of hydrocarbon liquids from the vapor. The cooled effluent is separated into its hydrogen rich vapor, hydrocarbon liquid, and water phases in the NKD CHIPS. The vapor joins vapor from the gasoil CHPS and is sent to a knockout drum before it enters an H2S absorber. The sour water stream containing ammonium bisulfide is sent to sour water stripping. The hydrocarbon liquid is fed to the NKD CLPS.

In the NKD CLPS, the liquid is separated from the vapor and is heated by heat exchange with NKD ASAT reactor effluent before being fed to the NKD Product Stripper. The sour gas from the NKD CLPS is sent for further treatment and hydrogen recovery.

When producing synthetic crude, the entire aromatics saturation step can be eliminated and the hydrogen and product recovery sections combined.

The fractionation section may include a Gasoil product stripper, a Naphtha/Kerosene/Diesel Product Stripper, and a Product Fractionator. The fractionation section may be designed to separate reaction products into Light Ends for separation of LPG, Naphtha, Kerosene, Diesel, and treated Gasoil.

The product stripper's primary function is to separate light products at sufficient pressure to feed a deethanizer column in the light ends recovery section without the need for a sour gas compressor.

After flashing hydrogen gas, the remaining liquid reactor effluent is routed to the product stripper. In the product stripper, the gas, propane, butane, and some unstabilized naphtha are removed from the reactor effluent for processing in the light ends recovery section. The heavier products of Gasoil product stripper are then routed from the bottom to tankage is a treated gasoil. The heavier products of the Naphtha/Kerosene/Diesel Product Stripper, a combination of treated naphtha, jet fuel and diesel, are routed from the bottom to the fractionator feed furnace for heating before entering the fractionator, which operates at low pressure.

The product stripper is refluxed with unstabilized naphtha and stripped with superheated steam. Water from the product stripper cannot be recycled back to injection water system in the reactor because of the high concentration of ammonium bisulfide.

The fractionator system separates the NKD ASAT reactor effluent into naphtha, kerosene, and diesel. Overhead vapor from the fractionator is condensed in the total condenser and sent to the overhead accumulator. A fixed amount of the liquid is returned to the fractionator as reflux. A vapor line from the overhead accumulator to the flare system is included should any vapors build up. The net liquid product from the accumulator is naphtha, which is sent to the light ends recovery section. Water from the overhead accumulator is sent to the water injection drum in the reaction section.

Trays are provided in the fractionator for separation of naphtha and kerosene and between kerosene and diesel. A liquid draw is taken from the fractionator and stripped in the kerosene sidecut stripper. The overhead vapor is returned to the fractionator. The stripper bottoms stream is pumped by the kerosene product pump and then cooled. The cooled product is sent to tankage. The fractionator bottoms stream is pumped by the fractionator bottoms pump to the fractionator feed preheat exchanger and after cooling sent to tankage.

As described above, catalysts may be provided in each of the reactors to perform various hydroprocessing operations including hydrogenation (diolefins saturation, monoolefins saturation and/or aromatics saturation), hydrodeoxygenation, hydrodemetallization, hydrodenitrogenation, hydrocracking, hydrodesulfurization and hydrotreating. A hydrotreating catalyst, for example, may include any catalyst composition that may be used to catalyze the hydrogenation of hydrocarbon feedstocks to increase its hydrogen content and/or remove heteroatom contaminants. A hydrocracking catalyst, for example, may include any catalyst composition that may be used to catalyze the addition of hydrogen to large or complex hydrocarbon molecules as well as the cracking of the molecules to obtain smaller, lower molecular weight molecules.

Hydroprocessing catalyst compositions for use in processes according to embodiments disclosed herein are well known to those skilled in the art and several are commercially available from W.R. Grace & Co., Criterion Catalysts & Technologies, and Albemarle, among others. Suitable hydroconversion catalysts may include one or more elements selected from Groups 4-12 of the Periodic Table of the Elements. In some embodiments, hydroconversion catalysts according to embodiments disclosed herein may comprise, consist of, or consist essentially of one or more of nickel, cobalt, tungsten, molybdenum and combinations thereof, either unsupported or supported on a porous substrate such as silica, alumina, titania, or combinations thereof. As supplied from a manufacturer or as resulting from a regeneration process, the hydroconversion catalysts may be in the form of metal oxides, metal hydrides, or metal sulfides, for example. In some embodiments, the catalysts may be pre-sulfided and/or pre-conditioned prior to introduction to the reactor(s).

Hydrotreating and hydrogenation catalysts that may be useful include catalysts generally composed of a hydrogenation component, selected from Group 6 elements (such as molybdenum and/or tungsten) and Group 8-10 elements (such as cobalt and/or nickel), or a mixture thereof, which may be supported on an alumina support. Phosphorous (Group 15) oxide is optionally present as an active ingredient. A typical catalyst may contain from 3 to 35 wt % hydrogenation components, with an alumina binder. The catalyst pellets may range in size from 1/32 inch to 1/8 inch, and may be of a spherical, extruded, trilobate or quadrilobate shape. Catalyst layer(s) for demetallization, when present, may comprise catalyst(s) having an average pore size ranging from 125 to 225 Angstroms and a pore volume ranging from 0.5-1.1 $cm^3/g$. Catalyst layer(s) for denitrification/desulfurization may comprise catalyst(s) having an average pore size ranging from 100 to 190 Angstroms with a pore volume of 0.5-1.1 $cm^3/g$. U.S. Pat. No. 4,990,243 describes a hydrotreating catalyst having a pore size of at least about 60 Angstroms, and preferably from about 75 Angstroms to about 120 Angstroms. A demetallation catalyst useful for the present process is described, for example, in U.S. Pat. No. 4,976,848, the entire disclosure of which is incorporated herein by reference for all purposes. Likewise, catalysts useful for desulfurization of heavy streams are described, for example, in U.S. Pat. Nos. 5,215,955 and 5,177,047, the entire disclosures of which are incorporated herein by reference for all purposes. Catalysts useful for desulfurization of middle distillate, vacuum gas oil streams and naphtha streams are described, for example, in U.S. Pat. No. 4,990,243, the entire disclosures of which are incorporated herein by reference for all purposes.

Reactors for hydrogenating the light distillate fraction, such as reactors 18 and 218, may be operated at reaction conditions including a temperature in the range from about 100° C. to about 250° C., a hydrogen partial pressure in the range from about 400 to about 500 psi, and a liquid hourly space velocity in the range from about 2 to about 6 L per hour per L catalyst.

Reactors for hydrodemetallization of the light distillate fraction, such as reactors 22 and 222, may be operated at reaction conditions including a temperature in the range from about 200° C. to about 440° C., a hydrogen partial pressure in the range from about 400 to about 2600 psi, and a liquid hourly space velocity in the range from about 0.5 to about 5.0 L per hour per L catalyst.

Reactors for hydrotreating (HDN, HDS, HDO, HDA, etc.) the light distillate fraction, such as reactor 26, may be operated at reaction conditions including a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

Reactors for hydrodemetallization of the gas oil fraction, such as reactors 30, 226, may be operated at reaction conditions including a temperature in the range from about 200° C. to about 440° C., a hydrogen partial pressure in the range from about 400 to about 2600 psi, and a liquid hourly space velocity in the range from about 0.5 to about 5.0 L per hour per L catalyst.

Reactors for hydrotreating (HDN, HDS, HDO, HDA, etc.) of the gas oil fraction, such as reactors 34, 230, may be operated at reaction conditions including a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

Reactors for hydrotreating (HDN, HDS, HDO, HDA, etc.) a mixture of the light distillate fraction and the heavy distillate fraction, such as reactor 234, may be operated at reaction conditions including a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

In reactor 18 carrying out the diolefins saturation reactions (DOS), the catalysts used are tailored for double bond saturation and little heteroatom removal (HDN, HDS, HDO, HDA) is achieved. The diolefins saturation is in the range from about 90% to about 100%.

In reactors carrying out the hydrodemetallization reactions, HDN removal is in the range from about less than 1% to about 15%. HDS removal is in the range from about less than 1% to about 15%. HDO removal is in the range from about 10% to about 50%. HDM removal is in the range from about 70% to about 100%. These include reactors 22, 30.

In reactors carrying out the hydrotreating reactions, the HDN removal is in the range from about 40% to about 100%. The HDS removal is in the range from about 40% to about 100%. The HDO removal is in the range from about 80% to about 100%. The HDM removal is in the range from about 30% to about 100%. These include reactors 26, 34.

The processes as described with respect to FIGS. 1 and 2 may include additional hydrocarbon feedstocks in addition to whole shale oil. For example, one or more additional hydrocarbon feedstocks may be fed to fractionator 12, 212. The one or more additional hydrocarbon feedstocks may include hydrocarbonaceous materials derived from thermal tars, bitumen, coke oven tars, asphaltenics, coal gasification tars, biomass-derived tars, black liquor tars, or reactive hydrocarbonaceous materials derived from thermal tars, bitumen, coke oven tars, asphaltenics, coal gasification tars, biomass-derived tars, and black liquor tars, produced in one or more of thermal cracking, pyrolysis, and retorting processes. As another example, one or more additional hydrocarbon feedstocks may be fed to hydroprocessing reactors 30, 226.

Figure 3:
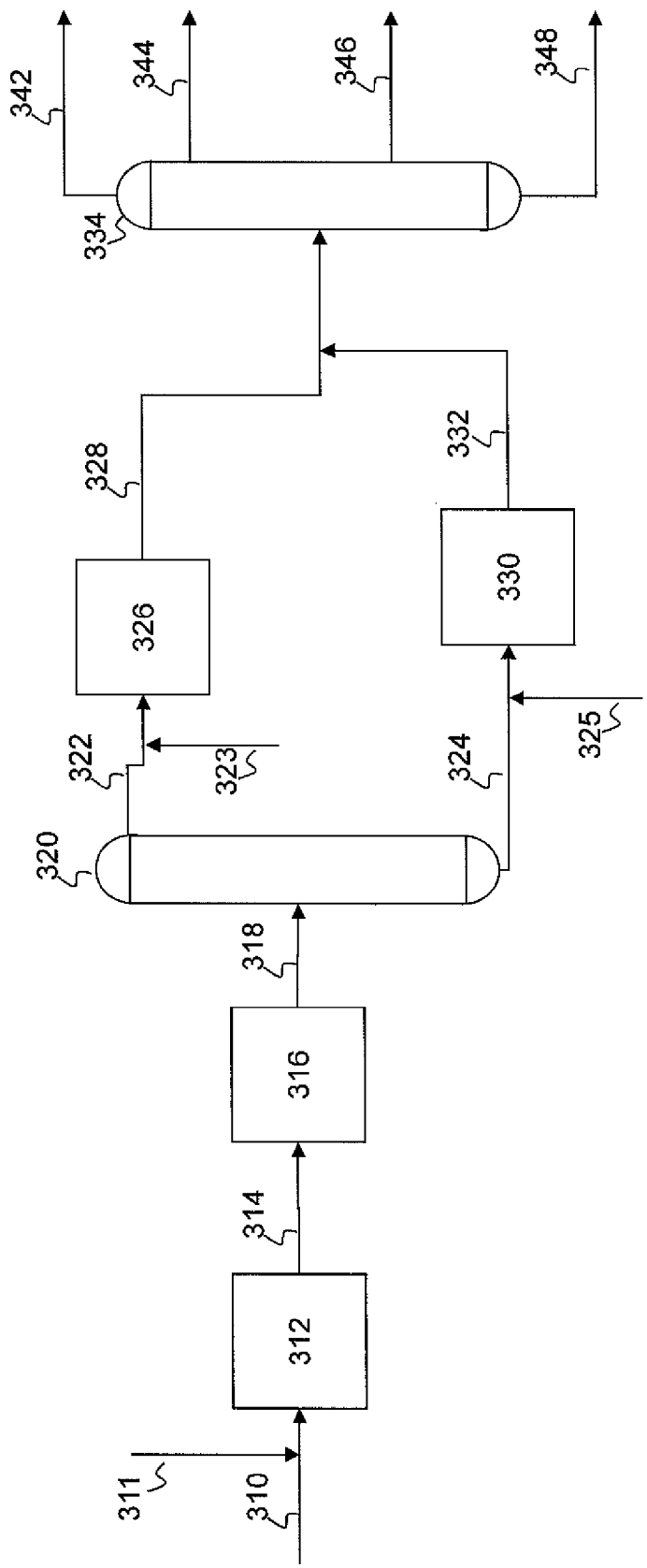

Referring now to FIG. 3, a simplified flow diagram of an integrated process for upgrading crude shale-derived oils produced by oil shale retorting according to embodiments herein is illustrated. A whole shale oil 310 and hydrogen 311 may be contacted in a first-stage hydroprocessing reactor 312 containing hydrogenation catalysts to saturate diolefins contained in the whole shale oil. Following hydrogenation, an effluent 314 may be recovered from the first-stage hydroprocessing reactor 312.

The effluent 314 from the first-stage hydroprocessing reactor 312 may be fed, without phase separation, to a second-stage hydroprocessing reactor 316, which may be operated in an upflow mode and containing catalysts to perform hydrodemetallization and saturation of mono-olefins in the effluent 314 from the first-stage hydroprocessing reactor 316. Following hydroprocessing, an effluent 318 may be recovered from the second-stage hydroprocessing reactor 316.

Effluent 318 may then be fed to a fractionation system 320 to separate effluent 318 into a first partially hydrotreated fraction 322, including naphtha, kerosene and diesel, and a second partially hydrotreated fraction 324, including gas oil and resid.

The first partially hydrotreated fraction 322 may then be fed to a third-stage hydroprocessing reactor 326 having one or more beds of catalyst to perform hydrodenitrogenation, hydrodesulfurization, hydrodeoxygenation, and aromatics saturation of the first partially hydrotreated fraction 322. Following hydroprocessing, an effluent 328 may be recovered from the third-stage hydroprocessing reactor 326.

The second partially hydrotreated fraction 324 may also be fed to a third-stage hydroprocessing reactor 330 having one or more beds of catalyst to perform hydrodenitrogenation, hydrodesulfurization, hydrodeoxygenation, and aromatics saturation of the second partially hydrotreated fraction 324. Following hydroprocessing, an effluent 332 may be recovered from the third-stage hydroprocessing reactor 330.

Unreacted hydrogen may be recovered from the top of fractionation system 320 along with first partially hydrotreated fraction 322. Additional hydrogen may be fed, if necessary, via flow line 323 for hydroprocessing in third-stage reactor 326. Likewise, dissolved hydrogen may be contained in the second partially hydrotreated fraction 324. If necessary, additional hydrogen may be fed via flow line 325 for hydroprocessing in third-stage reactor 330.

The effluents 328, 332 from third-stage hydroprocessing reactors 326, 330, respectively, may then be fed to a separation train 334 to recover two or more hydrocarbon fractions. Separation train 334 may include one or more distillation and/or extractive distillation columns useful for separating the effluents into two or more hydrocarbon fractions. In some embodiments, such as illustrated in FIG. 3, the two or more fractions may include at least one of light gas byproducts and unreacted hydrogen 342, kerosene 344, diesel 346, and a residuum fraction 348. Other hydrocarbon fractions may also be recovered in various embodiments.

Figure 4:
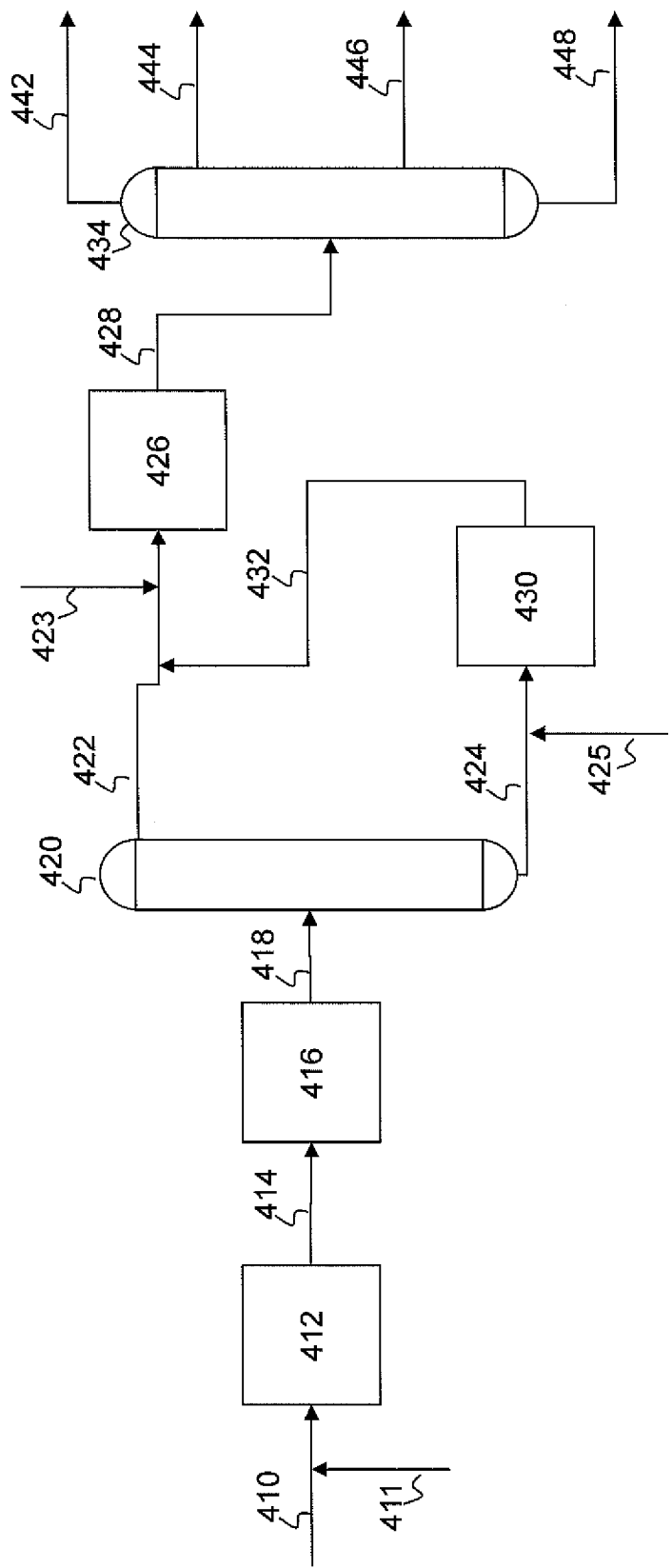

Referring now to FIG. 4, a simplified flow diagram of an integrated process for upgrading crude shale-derived oils produced by oil shale retorting according to embodiments herein is illustrated. A whole shale oil 410 and hydrogen 411 may be contacted in a first-stage hydroprocessing reactor 412 containing hydrogenation catalysts to saturate diolefins contained in the whole shale oil. Following hydrogenation, an effluent 414 may be recovered from the first-stage hydroprocessing reactor 412.

The effluent 414 from the first-stage hydroprocessing reactor 412 may be fed, without phase separation, to a second-stage hydroprocessing reactor 416, which may be operated in an upflow mode and containing catalysts to perform hydrodemetallization and saturation of mono-olefins in the effluent 414 from the first-stage hydroprocessing reactor 412. Following hydroprocessing, an effluent 418 may be recovered from the second-stage hydroprocessing reactor 416.

Effluent 418 may then be fed to a fractionation system 420 to separate effluent 418 into a first partially hydrotreated fraction 422, including naphtha, kerosene and diesel, and a second partially hydrotreated fraction 424, including gas oil and resid.

The second partially hydrotreated fraction 424 may be fed to a third-stage hydroprocessing reactor 430 having one or more beds of catalyst to perform hydrodenitrogenation, hydrodesulfurization, hydrodeoxygenation, and aromatics saturation of the second partially hydrotreated fraction 424. Following hydroprocessing, an effluent 432 may be recovered from the third-stage hydroprocessing reactor 430.

The first partially hydrotreated fraction 422 and effluent 432 may then be fed to a third-stage hydroprocessing reactor 426 having one or more beds of catalyst to perform hydrodenitrogenation, hydrodesulfurization, hydrodeoxygenation, and aromatics saturation of the first partially hydrotreated fraction 422 and effluent 432. Following hydroprocessing, an effluent 428 may be recovered from the third-stage hydroprocessing reactor 426.

Unreacted hydrogen may be recovered from the top of fractionation system 420 along with first partially hydrotreated fraction 422. Additional hydrogen may be fed, if necessary, via flow line 423 for hydroprocessing in third-stage reactor 426. Likewise, dissolved hydrogen may be contained in the second partially hydrotreated fraction 424. If necessary, additional hydrogen may be fed via flow line 425 for hydroprocessing in third-stage reactor 430.

The effluent 428 from third-stage hydroprocessing reactors 426 may then be fed to a separation train 434 to recover two or more hydrocarbon fractions. Separation train 434 may include one or more distillation and/or extractive distillation columns useful for separating the effluents into two or more hydrocarbon fractions. In some embodiments, such as illustrated in FIG. 4, the two or more fractions may include at least one of light gas byproducts and unreacted hydrogen 442, kerosene 444, diesel 446, and a residuum fraction 448. Other hydrocarbon fractions may also be recovered in various embodiments.

Figure 5:
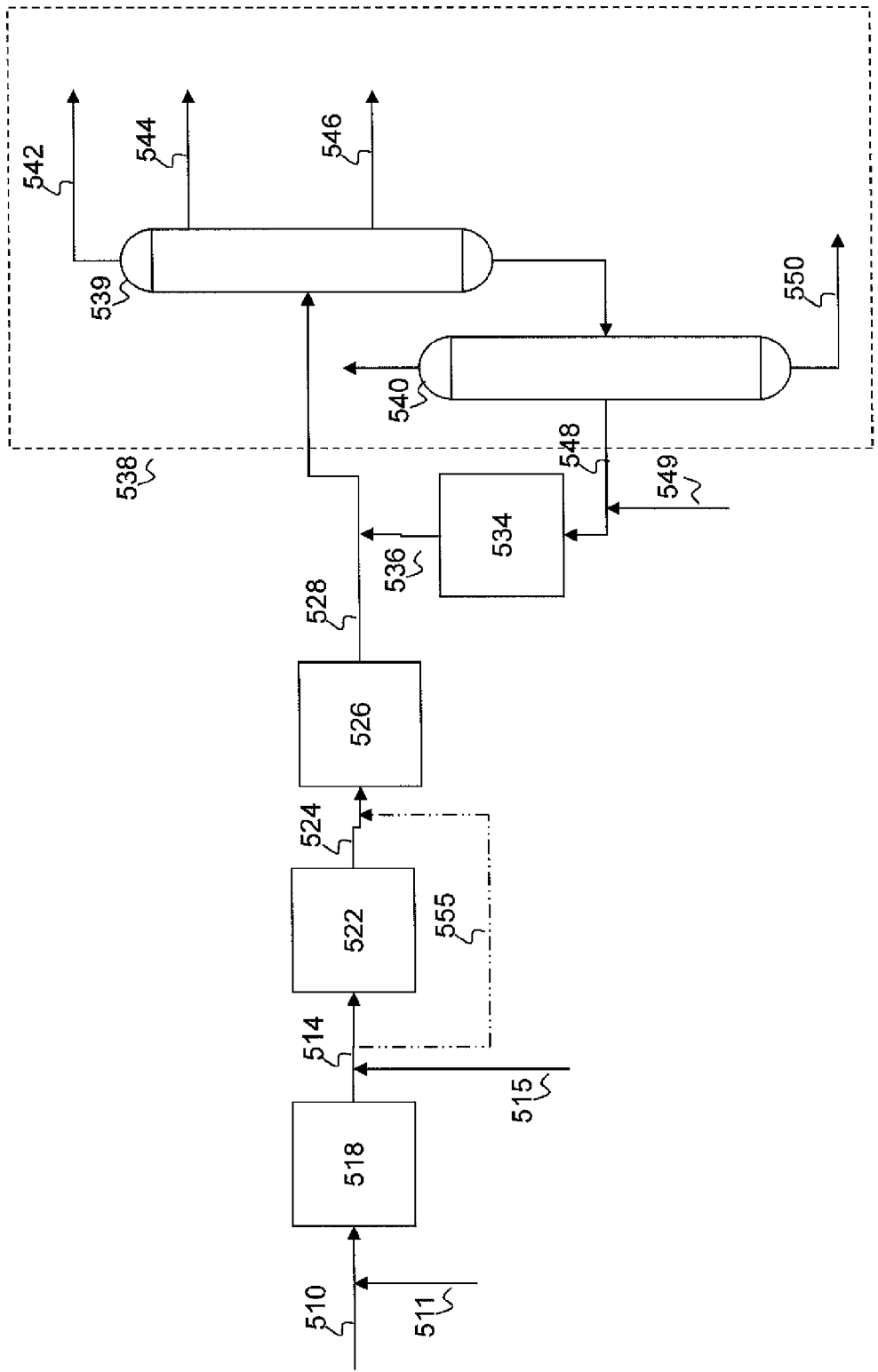

Referring now to FIG. 5, a simplified flow diagram of an integrated process for upgrading crude shale-derived oils produced by oil shale retorting according to embodiments herein is illustrated. A whole shale oil 510 and hydrogen 511 may be contacted in a first-stage hydroprocessing reactor 518 containing catalysts to saturate diolefins contained in the whole shale oil. Following hydrogenation, an effluent 514 may be recovered from the first-stage hydroprocessing reactor 518.

The effluent 514 from the first-stage hydroprocessing reactor 518 may be fed, without phase separation, to a second-stage hydroprocessing reactor 522, which may be operated in an upflow mode and containing catalysts to perform hydrodemetallization and saturation of mono-olefins in the effluent 514 from the first-stage hydroprocessing reactor 522. Additional hydrogen 515 may be added as necessary. Following hydroprocessing, an effluent 524 may be recovered from the second-stage hydroprocessing reactor 522.

The effluent 524 from the second-stage hydroprocessing reactor 522 may be fed, with or without phase separation, to a third-stage hydroprocessing reactor 526 having one or more beds of catalyst to perform hydrodenitrogenation, hydrodesulfurization, hydrodeoxygenation, and aromatics saturation of the effluent from the second stage hydroprocessing reactor 522. Following hydroprocessing, an effluent 528 may be recovered from the third-stage hydroprocessing reactor 526.

The effluent 528 from the third-stage hydroprocessing reactor 526 may then be fed to a separation train 538. Separation train 538 may include one or more distillation and/or extractive distillation columns useful for separating the effluents into two or more hydrocarbon fractions. In some embodiments, such as illustrated in FIG. 5, the separation train 538 may include an atmospheric distillation column 539 and a vacuum distillation column 540 to separate the effluent 528 into distillate fractions including light gas fraction 542, naphtha 544, kerosene, jet, and diesel fraction 546, as well as a hydrotreated vacuum gas oil fraction 548 and a low sulfur fuel oil fraction 550.

The hydrotreated vacuum gas oil fraction 548 and hydrogen 549 may then be fed to a fourth-stage hydroprocessing reactor 534, which may include one or more beds of catalyst to perform hydrocracking of the hydrotreated vacuum gas oil fraction. Following hydrocracking, an effluent 536 may be recovered from the fourth-stage hydroprocessing reactor 534. The effluent 536 from the fourth-stage hydroprocessing reactor 534 may then be fed to the fractionation train 538 for separation as described above.

The processing of the oil through the reactors illustrated in FIG. 5 may be performed on a continuous basis. Similar to reactors 222, 226, reactor 522 may require more frequent catalyst changes as compared to reactors 518, 526, 534. Bypass line 555 may be provided for bypassing the second stage reactor 522 to replace catalyst within the reactor while continuing to operate the remainder of the process.

In the embodiment illustrated in FIG. 5, the shale oil feed is first processed in reactors 518, 522, and 526 to achieve near complete demetallation, hydrodenitrification, hydrodesulfurization, and some aromatic saturation. Limited hydrocracking may also result. Following product separation, the vacuum gas oil fraction 548 may be completely hydrocracked to products by operating at about 60% per pass conversion. Further, the unconverted oil recovered from the vacuum column bottoms is an excellent quality FCC feedstock.

The process of FIG. 5, as well as other embodiments herein, may provide for the capability to adjust the first stage reactor severity to address feed variations, may produce high quality FCC feedstocks, and may provide a consistent feed to the hydrocracking reactor 534 to produce high quality mid distillates and ensure extended catalyst life, among other advantages.

FIGS. 3, 4, and 5 thus illustrate alternative process flow schemes for upgrading the heavy and light components in whole shale oil via hydroprocessing. Catalysts useful in the reactors described with respect to FIGS. 3-5 are similar to those as described above with respect to FIGS. 1 and 2.

Reactors for hydrodemetallization of the whole shale oil, such as reactors 316, 416, and 522 may be operated at reaction conditions including a temperature in the range from about 200° C. to about 400° C., a hydrogen partial pressure in the range from about 400 to about 2600 psi, and a liquid hourly space velocity in the range from about 0.5 to about 5.0.

Reactors for hydrotreating (HDN, HDS, HDO, ASAT, etc.) the light distillate fraction, such as reactor 326, may be operated at reaction conditions including a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

Reactors for hydrotreating (HDN, HDS, HDO, ASAT, etc.) a mixture of the light and heavy distillate, such as reactor 426 and 526, may be operated at reaction conditions including a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

Reactors for hydrotreating (HDN, HDS, HDO, ASAT, etc.) the heavy distillate fraction, such as reactors 330, 430 may be operated at reaction conditions including a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

In reactors carrying out the diolefins saturation reactions (DOS), the catalysts used are tailored to double bond saturation and little heteroatom removal (HDN, HDS, HDO, ASAT) is achieved. The diolefins saturation is in the range from about 90% to about 100%. These include reactors 312, 412, 518.

In reactors carrying out the hydrodemetallization reactions, HDN removal is in the range from about less than 1% to about 15%. HDS removal is in the range from about less than 1% to about 15%. HDO removal is in the range from about 10% to about 50%. HDM removal is in the range from about 70% to about 100%. These include reactors 226, 316, 416, 522.

In reactors carrying out the hydrotreating reactions, the HDN removal is in the range from about 40% to about 100%. The HDS removal is in the range from about 40% to about 100%. The HDO removal is in the range from about 80% to about 100%. The HDM removal is in the range from about 30% to about 100%. These include reactors 230, 234, 326, 426, 526.

In reactor 526, carrying out hydrocracking of the partially hydrotreated gas oil fraction, the per pass conversion may be in the range from about 40% to about 70%.

The processes as described with respect to FIGS. 3-5 may include additional hydrocarbon feedstocks in addition to whole shale oil. For example, one or more additional hydrocarbon feedstocks may be fed to reactors 312, 412. The one or more additional hydrocarbon feedstocks may include hydrocarbonaceous materials derived from thermal tars; bitumen; coke oven tars; asphaltenics; coal gasification tars; biomass-derived tars; black liquor tars, such as reactive hydrocarbonaceous materials from one or more of thermal cracking, pyrolysis, and retorting processes derived from thermal tars; bitumen; coke oven tars; asphaltenics; coal gasification tars; biomass-derived tars; black liquor tars. As another example, one or more additional hydrocarbon feedstocks may be fed to hydroprocessing reactors 330, 430, or 534.

As described above, embodiments disclosed herein provide for a split-flow processing scheme to upgrade whole shale oil. The split flow concepts described herein, i.e., naphtha and kerosene hydrotreating in one or more stages and gas oil hydrotreating in one or more stages, requires additional equipment as compared to the alternative approach of whole oil hydrotreating. While contrary to conventional wisdom as requiring more capital equipment to achieve the same final product specifications, the operating efficiency vis a vis on-stream time efficiency and product quality resulting from the split flow concept far exceed in value the somewhat incrementally higher capital expenditure costs.

Embodiments herein advantageously eliminate the disadvantages of the alternative whole oil hydroprocessing concept as noted above. Further, the split-processing embodiments disclosed herein optimize catalyst utilization, product yields, and hydrogen consumption. These advantages directly translate to lower investment, utilities and manpower. The disclosed embodiments avoid numerous problems characteristic to the previous whole oil hydrotreating solutions, including: inhibiting heavy oil hydrocracking (directly or via reduction of hydrogen partial pressure); cracking away some desired products (diesel) because whole oil hydrotreating conditions are more severe than diesel hydrotreating; consumption of more hydrogen because of excessive hydrocracking and oversaturation of heavy oils; and impeding of the diesel hydrotreating function by the presence of very large molecules from heavy oil streams. This aspect becomes very important when producing ULSD (ultra-low sulfur diesel).

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. An integrated system for upgrading crude shale-derived oils produced by oil shale retorting or by in situ extraction or by mixtures thereof that includes the following:
   a. a fractionator for fractionating the whole shale oil into a first fraction comprising naphtha, kerosene and diesel and an atmospheric bottoms fraction comprising gas oil and residuum;
   b. a first-stage hydroprocessing reactor containing a hydrogenation catalyst to saturate diolefins contained in the first fraction with hydrogen and having an outlet for recovering an effluent;
   c. a second-stage hydroprocessing reactor configured to be operated in an upflow mode and containing catalysts to perform hydrodemetallization and saturation of mono-olefins in the effluent from the first-stage hydroprocessing reactor and having an outlet for recovering a second-stage hydroprocessing reactor effluent, wherein the first-stage hydroprocessing reactor and the second-stage hydroprocessing reactor are fluidly connected such that the effluent from the first-stage hydroprocessing reactor is fed to the second-stage hydroprocessing reactor without phase separation;
   d. a third-stage hydroprocessing reactor having one or more beds of catalyst to perform hydrodenitrogenation, hydrodesulfurization, hydrodeoxygenation, and aromatics saturation of the second-stage hydroprocessing reactor effluent and having an outlet for recovering a third-stage hydroprocessing reactor effluent, wherein the second-stage hydroprocessing reactor and the third-stage hydroprocessing reactor are fluidly connected such that the effluent from the second-stage hydroprocessing reactor is fed to the third-stage hydroprocessing reactor without phase separation;
   e. a fourth-stage hydroprocessing reactor operated in an upflow mode and containing catalysts to perform hydrodemetallization of the atmospheric bottoms fraction and having an outlet for recovering a fourth-stage reactor effluent;
   f. a fifth-stage hydroprocessing reactor having one or more beds of catalyst each containing a catalyst to perform one or more of hydrotreating and hydrocracking of the fourth-stage hydroprocessing reactor effluent and having an outlet for recovering a fifth-stage hydroprocessing reactor effluent, wherein the fourth-stage hydroprocessing reactor and the fifth-stage hydroprocessing reactor are fluidly connected such that the effluent from the fourth-stage hydroprocessing reactor is fed to the fifth-stage hydroprocessing reactor without phase separation;
   g. a separation train to recover two or more hydrocarbon fractions from the fifth-stage hydroprocessing reactor effluents of (f) and the third-stage hydroprocessing reactor effluents of (d).

2. The system of claim 1, wherein the two or more hydrocarbon fractions include at least one of naphtha, kerosene, diesel, and a residuum fraction.

3. The system of claim 1, wherein
   the catalyst in the first stage hydroprocessing reactor comprises an alumina base extruded catalyst with nickel and molybdenum as active metals;
   the catalyst in the second stage hydroprocessing reactor comprises an alumina base spheroidal catalyst with nickel and molybdenum as active metals;
   the catalyst in the third stage hydroprocessing reactor comprises a layered catalyst comprised of a layer of amorphous base metal Type II extruded catalyst with an organic compound and nickel and molybdenum as active metals and a layer of base metal extruded catalyst containing both amorphous and zeolitic components with nickel and tungsten as active metals;
   the catalyst in the fourth stage hydroprocessing reactor comprises an alumina base spheroidal catalyst with nickel and molybdenum as active metals; and
   the catalyst in the fifth stage hydroprocessing reactor comprises an amorphous base metal Type II extruded catalyst with an organic compound and nickel and molybdenum as active metals.

4. The system of claim 1, wherein:
   the first stage hydroprocessing reactor is configured to operate at reaction conditions comprising a temperature in the range from about 100° C. to about 250° C., a hydrogen partial pressure in the range from about 400 psi to about 500 psi, and a liquid hourly space velocity in the range from about 2 to about 6 L per hour per L catalyst;
   the second stage hydroprocessing reactor is configured to operate at reaction conditions comprising a temperature in the range from about 200° C. to about 440° C., a hydrogen partial pressure in the range from about 400 to about 2600 psi, and a liquid hourly space velocity in the range from about 0.5 to about 5 L per hour per L catalyst;
   the third stage hydroprocessing reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst;
   the fourth stage hydroprocessing reactor is configured to operate at reaction conditions comprising a temperature in the range from about 200° C. to about 440° C., a hydrogen partial pressure in the range from about 400 to about 2600 PSI, and a liquid hourly space velocity in the range from about 0.5 to about 5.0 L per hour per L catalyst;
   the fifth stage hydroprocessing reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

5. The system of claim 1, further comprising fluid conduits for bypassing at least one of the second-stage hydroprocessing reactor of (c) and the fourth-stage hydroprocessing reactor of (e) to replace catalyst within the reactors while continuing to operate (a), (b), (d), (f), and (g).

6. The system of claim 1, further comprising an inlet for feeding one or more additional hydrocarbon feedstocks to the fractionator (a), the one or more additional hydrocarbon feedstocks comprising hydrocarbonaceous materials derived from thermal tars, bitumen, coke oven tars, asphaltenics, coal gasification tars, biomass-derived tars, and black liquor tars.

7. The system of claim 1, further comprising an inlet for feeding one or more additional hydrocarbon feedstocks to the fourth-stage hydroprocessing reactor (e), the one or more additional hydrocarbon feedstocks comprising hydrocarbonaceous materials derived from thermal tars, bitumen, coke oven tars, asphaltenics, coal gasification tars, biomass-derived tars, and black liquor tars.

8. An integrated system for upgrading crude shale-derived oils produced by oil shale retorting or by in situ extraction or combinations thereof that includes the following:
   a. a fractionator for fractionating the whole shale oil into a first fraction comprising naphtha, kerosene and diesel and an atmospheric bottoms fraction comprising gas oil and residuum;
   b. a first-stage hydroprocessing reactor containing a hydrogenation catalyst for reacting the first fraction and hydrogen to saturate diolefins contained in the first fraction and having an outlet for recovering an effluent from the first-stage hydroprocessing reactor;
   c. a second-stage hydroprocessing reactor configured to be operated in an upflow mode and containing catalysts to perform hydrodemetallization and saturation of mono-olefins in the effluent from the first-stage hydroprocessing reactor and having an outlet for recovering an effluent from the second-stage hydroprocessing reactor, wherein the first-stage hydroprocessing reactor and the second-stage hydroprocessing reactor are fluidly connected such that the effluent from the first-stage hydroprocessing reactor is fed to the second-stage hydroprocessing reactor without phase separation;
   d. a third-stage hydroprocessing reactor configured to be operated in an upflow mode and containing catalysts to perform hydrodemetallization of the atmospheric bottoms fraction and having an outlet for recovering an effluent from the third-stage hydroprocessing reactor;
   e. a fourth-stage hydroprocessing reactor having one or more beds of catalyst each containing a catalyst to perform one or more of hydrotreating and hydrocracking of the effluent from the third-stage hydroprocessing reactor and having an outlet for recovering an effluent from the fourth-stage hydroprocessing reactor, wherein the fourth-stage hydroprocessing reactor and the third-stage hydroprocessing reactor are fluidly connected such that the effluent from the third-stage hydroprocessing reactor is fed to the fourth-stage hydroprocessing reactor without phase separation;
   f. a fifth-stage hydroprocessing reactor having one or more beds of catalyst to perform hydrodenitrogenation, hydrodesulfurization, hydrodeoxygenation, and aromatics saturation of the effluents from the second- and fourth-stage hydroprocessing reactors and having an outlet for recovering an effluent from the fifth-stage hydroprocessing reactor, wherein the second-, fourth-, and fifth-stage hydroprocessing reactors are fluidly connected such that the effluents from the second- and fourth-stage hydroprocessing reactors are fed to the fifth-stage hydroprocessing reactor without phase separation;
   g. a separation train for separating the effluent from the fifth-stage hydroprocessing reactor of (f) into two or more hydrocarbon fractions.

9. The system of claim 8, wherein the two or more hydrocarbon fractions include at least one of naphtha, kerosene, diesel, and a residuum fraction.

10. The system of claim 8, wherein
the catalyst in the first stage reactor comprises an alumina base extruded catalyst with nickel and molybdenum as active metals;
the catalyst in the second stage reactor comprises an alumina base spheroidal catalyst with nickel and molybdenum as active metals;
the catalyst in the third stage reactor comprises an alumina base spheroidal catalyst with nickel and molybdenum as active metals;
the catalyst in the fourth stage reactor comprises an amorphous base metal Type II extruded catalyst with an organic compound and nickel and molybdenum as active metals; and
the catalyst in the fifth stage reactor comprises a layered catalyst comprised of a layer of amorphous base metal Type II extruded catalyst with an organic compound and nickel and molybdenum as active metals and a layer of base metal extruded catalyst containing both amorphous and zeolitic components with nickel and tungsten as active metals.

11. The system of claim 8, wherein:
the first stage reactor is configured to operate at reaction conditions comprising a temperature in the range from about 100° C. to about 250° C., a hydrogen partial pressure in the range from about 400 to about 500 psi, and a liquid hourly space velocity in the range from about 2 to about 6 L per hour per L catalyst;
the second stage reactor is configured to operate at reaction conditions comprising a temperature in the range from about 200° C. to about 400° C., a hydrogen partial pressure in the range from about 400 to about 2600 psi, and a liquid hourly space velocity in the range from about 0.5 to about 5.0 L per hour per L catalyst;
the third stage reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst;
the fourth stage reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst;
the fifth stage reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

12. The system of claim 8, further comprising fluid conduits for bypassing at least one of the second stage reactor of (c) and the fourth stage reactor of (d) to replace catalyst within the reactors while continuing to operate (a), (b), (e), (f), and (g).

13. The system of claim 8, further comprising an inlet for feeding one or more additional hydrocarbon feedstocks to the fractionator (a), the one or more additional hydrocarbon feedstocks comprising hydrocarbonaceous materials derived from thermal tars, bitumen, coke oven tars, asphaltenics, coal gasification tars, biomass-derived tars, and black liquor tars.

14. The system of claim 8, further comprising an inlet for feeding one or more additional hydrocarbon feedstocks to the third-stage hydroprocessing reactor of (d), the one or more additional hydrocarbon feedstocks comprising hydrocarbonaceous materials derived from thermal tars, bitumen, coke oven tars, asphaltenics, coal gasification tars, biomass-derived tars, and black liquor tars.

15. An integrated system for upgrading crude shale-derived oils produced by oil shale retorting or by in situ extraction or combinations thereof that includes the following:
   a. a first-stage hydroprocessing reactor containing hydrogenation catalysts for contacting the whole shale oil and hydrogen to saturate diolefins contained in the whole shale oil and having an outlet for recovering an effluent from the first-stage hydroprocessing reactor;

b. a second-stage hydroprocessing reactor configured to be operated in an upflow mode and containing catalysts to perform hydrodemetallization and saturation of mono-olefins in the effluent from the first-stage hydroprocessing reactor and having an outlet for recovering an effluent from the second-stage hydroprocessing reactor, wherein the first-stage hydroprocessing reactor and the second-stage hydroprocessing reactor are fluidly connected such that the effluent from the first-stage hydroprocessing reactor is fed to the second-stage hydroprocessing reactor without phase separation;

c. a fractionator for fractionating the effluent from the second-stage hydroprocessing reactor (b) into a partially hydrotreated fraction comprising naphtha, kerosene and diesel and a partially hydrotreated bottoms fraction comprising gas oil and residuum;

d. a third-stage hydroprocessing reactor having one or more beds of catalyst to perform hydrodenitrogenation, hydrodesulfurization, hydrodeoxygenation, and hydrodearomatization of the partially hydrotreated fraction and having an outlet for recovering an effluent from the third-stage hydroprocessing reactor;

e. a fourth-stage hydroprocessing reactor having one or more beds of catalyst to perform hydrodenitrogenation, hydrodesulfurization, hydrodeoxygenation, and aromatics saturation of the partially hydrotreated bottoms fraction and having an outlet for recovering an effluent from the fourth-stage hydroprocessing reactor;

f. a separation train for processing the effluents from the third-stage hydroprocessing reactor (d) and the fourth-stage hydroprocessing reactor (e) to recover two or more hydrocarbon fractions.

16. The system of claim 15, wherein the two or more hydrocarbon fractions include at least one of naphtha, kerosene, diesel, and a residuum fraction.

17. The system of claim 15, wherein
the catalyst in the first stage reactor comprises an alumina base extruded catalyst with nickel and molybdenum as active metals;
the catalyst in the second stage reactor comprises an alumina base spheroidal catalyst with nickel and molybdenum as active metals;
the catalyst in the third stage reactor comprises a layered catalyst comprised of a layer of amorphous base metal Type II extruded catalyst with an organic compound and nickel and molybdenum as active metals and a layer of base metal extruded catalyst containing both amorphous and zeolitic components with nickel and tungsten as active metals; and
the catalyst in the fourth stage reactor comprises an amorphous base metal Type II extruded catalyst with an organic compound and nickel and molybdenum as active metals.

18. The process of claim 15, wherein:
the first stage reactor is configured to operate at reaction conditions comprising a temperature in the range from about 100° C. to about 250° C., a hydrogen partial pressure in the range from about 400 to about 500 psi, and a liquid hourly space velocity in the range from about 2 to about 6 L per hour per L catalyst;
the second stage reactor is configured to operate at reaction conditions comprising a temperature in the range from about 200° C. to about 440° C., a hydrogen partial pressure in the range from about 400 to about 2600 psi, and a liquid hourly space velocity in the range from about 0.5 to about 5.0 L per hour per L catalyst;
the third stage reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst; and
the fourth stage reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

19. An integrated system for upgrading crude shale-derived oils produced by oil shale retorting or by in situ extraction or combinations thereof that includes the following:

a. a first-stage hydroprocessing reactor containing catalysts for contacting the whole shale oil and hydrogen to saturate diolefins contained in the whole shale oil and having an outlet for recovering an effluent from the first-stage hydroprocessing reactor;

b. a second-stage hydroprocessing reactor configured to be operated in an upflow mode and containing catalysts to perform hydrodemetallization and saturation of mono-olefins in the effluent from the first-stage hydroprocessing reactor and having an outlet for recovering an effluent from the second-stage hydroprocessing reactor, wherein the first-stage hydroprocessing reactor and the second-stage hydroprocessing reactor are fluidly connected such that the effluent from the first-stage hydroprocessing reactor is fed to the second-stage hydroprocessing reactor without phase separation;

c. a fractionator for fractionating the effluent from the second-stage hydroprocessing reactor (b) into a partially hydrotreated fraction comprising naphtha, kerosene and diesel and a partially hydrotreated bottoms fraction comprising gas oil and residuum;

d. a third-stage hydroprocessing reactor having one or more beds of catalyst to perform hydrodenitrogenation, hydrodesulfurization, hydrodeoxygenation, and aromatics saturation of the partially hydrotreated bottoms fraction and having an outlet for recovering an effluent from the third-stage hydroprocessing reactor;

e. a fourth-stage hydroprocessing reactor having one or more beds of catalyst to perform hydrodenitrogenation, hydrodesulfurization, hydrodeoxygenation, and aromatics saturation of a mixture of the effluent from the third-stage hydroprocessing reactor and the partially hydrotreated fraction comprising naphtha, kerosene, and diesel, and having an outlet for recovering an effluent from the fourth-stage hydroprocessing reactor;

f. a separation train for processing the effluent from the fourth-stage hydroprocessing reactor to recover two or more hydrocarbon fractions.

20. The system of claim 19, wherein the two or more hydrocarbon fractions include at least one of naphtha, kerosene, diesel, and a residuum fraction.

21. The system of claim 19, wherein
the catalyst in the first stage reactor comprises an alumina base extruded catalyst with nickel and molybdenum as active metals;
the catalyst in the second stage reactor comprises an alumina base spheroidal catalyst with nickel and molybdenum as active metals;

the catalyst in the third stage reactor comprises an amorphous base metal Type II extruded catalyst with an organic compound and nickel and molybdenum as active metals; and the catalyst in the fourth stage reactor comprises a layered catalyst comprised of a layer of amorphous base metal Type II extruded catalyst with an organic compound and nickel and molybdenum as active metals and a layer of base metal extruded catalyst containing both amorphous and zeolitic components with nickel and tungsten as active metal.

22. The system of claim 19, wherein:

the first stage reactor is configured to operate at reaction conditions comprising a temperature in the range from about 100° C. to about 250° C., a hydrogen partial pressure in the range from about 400 to about 500 psi, and a liquid hourly space velocity in the range from about 2 to about 6 L per hour per L catalyst;

the second stage reactor is configured to operate at reaction conditions comprising a temperature in the range from about 200° C. to about 440° C., a hydrogen partial pressure in the range from about 400 to about 2600 psi, and a liquid hourly space velocity in the range from about 0.5 to about 5.0 L per hour per L catalyst;

the third stage reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst; and the fourth stage reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst.

23. An integrated system for upgrading crude shale-derived oils produced by oil shale retorting or by in situ extraction or combinations thereof that includes the following:

a. a first-stage hydroprocessing reactor containing catalysts for contacting the whole shale oil and hydrogen to saturate diolefins contained in the whole shale oil and having an outlet for recovering an effluent from the first-stage hydroprocessing reactor;

b. a second-stage hydroprocessing reactor configured to be operated in an upflow mode and containing catalysts to perform hydrodemetallization and saturation of mono-olefins in the effluent from the first-stage hydroprocessing reactor and having an outlet for recovering an effluent from the second-stage hydroprocessing reactor, wherein the first-stage hydroprocessing reactor and the second-stage hydroprocessing reactor are fluidly connected such that the effluent from the first-stage hydroprocessing reactor is fed to the second-stage hydroprocessing reactor without phase separation;

c. a third-stage hydroprocessing reactor having one or more beds of catalyst to perform hydrodenitrogenation, hydrodesulfurization, hydrodeoxygenation, and aromatics saturation of the effluent from the second-stage hydroprocessing reactor and having an outlet for recovering an effluent from the third-stage hydroprocessing reactor, wherein the second-stage hydroprocessing reactor and the third-stage hydroprocessing reactor are fluidly connected such that the effluent from the second-stage hydroprocessing reactor is fed to the third-stage hydroprocessing reactor without phase separation;

d. a fractionation system for fractionating the effluent from the third-stage hydroprocessing reactor of (c) into a partially hydrotreated fraction, comprising naphtha, kerosene and diesel, and a partially hydrotreated vacuum gas oil fraction;

e. a fourth-stage hydroprocessing reactor having one or more beds of catalyst to perform hydrocracking of the partially hydrotreated vacuum gas oil fraction and having an outlet for recovering an effluent from the fourth-stage hydroprocessing reactor;

f. fluid conduits for feeding the effluent from the fourth-stage hydroprocessing reactor to the fractionation system (d);

wherein:

the catalyst in the first stage reactor comprises an alumina base extruded catalyst with nickel and molybdenum as active metals;

the catalyst in the second stage reactor comprises an alumina base spheroidal catalyst with nickel and molybdenum as active metals;

the catalyst in the third stage reactor comprises a layer of amorphous base metal Type II extruded catalyst with an organic compound and nickel and molybdenum as active metals and a layer of base metal extruded catalyst containing both amorphous and zeolitic components with nickel and tungsten as active metal; and the catalyst in the fourth stage reactor comprises a base metal extruded catalyst containing both amorphous and zeolitic components with nickel and tungsten as active metal.

24. The system of claim 23, wherein the two or more hydrocarbon fractions include at least one of naphtha, kerosene, diesel, and a residuum fraction.

25. The system of claim 23, wherein:

the first stage reactor is configured to operate at reaction conditions comprising a temperature in the range from about 100° C. to about 250° C., a hydrogen partial pressure in the range from about 400 to about 500 psi, and a liquid hourly space velocity in the range from about 2 to about 6 L per hour per L catalyst;

the second stage reactor is configured to operate at reaction conditions comprising a temperature in the range from about 200° C. to about 440° C., a hydrogen partial pressure in the range from about 400 to about 2600 psi, and a liquid hourly space velocity in the range from about 0.5 to about 5 L per hour per L catalyst;

the third stage reactor is configured to operate at reaction conditions comprising a temperature in the range from about 280° C. to about 440° C., a hydrogen partial pressure in the range from about 800 to about 2600 psi, and a liquid hourly space velocity in the range from about 0.3 to about 4.0 L per hour per L catalyst; and the fourth stage reactor is configured to operate at reaction conditions comprising a temperature in the range from about 330° C. to about 400° C., a hydrogen partial pressure in the range from about 1200 to about 2600 psi, and a liquid hourly space velocity in the range from about 0.7 to about 1.5 L per hour per L catalyst.

* * * * *